Sept. 10, 1968    D. M. HOLM ETAL    3,401,260
CORROSIVE LIQUID FLOW METER

Filed Oct. 31, 1966    2 Sheets-Sheet 1

INVENTORS
Dale M. Holm
John E. Deverall
BY

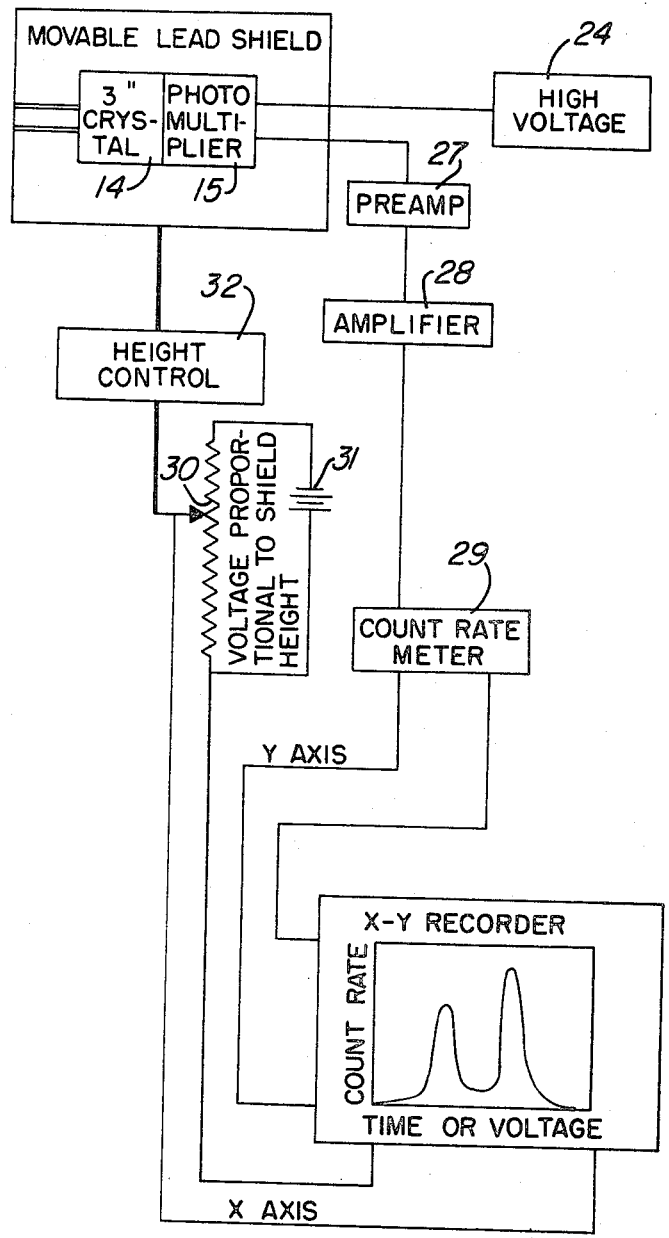

3,401,260
CORROSIVE LIQUID FLOW METER
Dale M. Holm and John E. Deverall, Los Alamos,
N. Mex., assignors to the United States of America
as represented by the United States Atomic Energy
Commission
Filed Oct. 31, 1966, Ser. No. 591,012
3 Claims. (Cl. 250—43.5)

ABSTRACT OF THE DISCLOSURE

A liquid flow meter having a remote radioactive detector and a source of radioactivity in the liquid, the fall of the liquid through a chamber occurring only while fast acting valve means prevent the influx of more liquid to the chamber so that the rate of fall of the liquid is proportional to the flow rate.

---

The invention described herein was made in the course of, or under, a contract with the U.S. Atomic Energy Commission.

The present invention relates to flow meters and more particularly to a radioactive float flow meter suitable for measuring the flow rates of highly corrosive and/or radioactive materials such as molten plutonium or NaK.

The development of nuclear reactors has resulted in the use of molten metals as fuels and/or reactor coolants. The movement and measurement of these molten metals have presented many problems in view of their high temperature, corrosion characteristics and, in many cases, intense radioactivity.

The present invention is a liquid flow meter comprising a chamber, a radioactive detector having a plurality of collimated views of the chamber, said detector and chamber positionally arranged so that the rate of fall of the liquid is proportional to the flow rate, said fall occurring while fast acting valve means prevent the influx of said liquid to the chamber. If a nonradioactive or weakly radioactive liquid is utilized, a float is positioned in the chamber, said float containing a radioactive foil.

An object of the present invention is to provide flow measurement means, particularly for measuring the flow of high temperature, highly corrosive and/or radioactive liquids.

The invention will become more apparent from the following description and drawing wherein:

FIGURE 3 is a block diagram of the electrical equipment utilized in conjunction with the photo tube.

Figure 1:
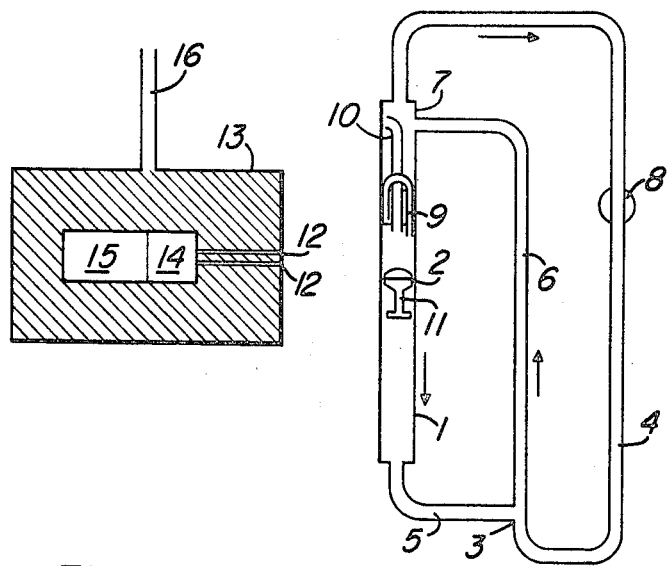
FIGURE 1 is a schematic diagram of one embodiment of the invention.

FIGURE 1 illustrates one embodiment of the invention wherein lower chamber 1 is partially filled with plutonium, e.g., to level 2. In the particular system illustrated a sodium electro-magnetic pump forces sodium to the juncture 3 wherein sodium from pipe 4 and plutonium from pipe 5 meet. The sodium and plutonium flow through pipe 6 to separation chamber 7. Since sodium and plutonium are immiscible and sodium is much less dense than plutonium the sodium floats on top of the plutonium and then returns to the pump 8. The plutonium rises in the separation chamber until it attains the maximum height of siphon 9. This siphon acts as a fast acting valve to empty the plutonium from separation chamber 7 into the lower chamber 1. Vent tube 10 equalizes pressure between the collection chamber and the flow chamber so that the plutonium in separation chamber 7 is not dumped until the plutonium level reaches the maximum siphon height. It should be noted that all volumes not occupied by structure or plutonium are filled with sodium. Therefore one can use the analogy that plutonium may be equated with water and sodium with air in the understanding of the operation of the siphon.

The equalizer tube is necessary to transfer sodium into the region above the fuel during a falling fuel level and to transfer sodium out of this region during a rising fuel level. Otherwise a vacuum would be generated in the volume above the fuel level and this would draw in sodium from the separation chamber. This sodium would then be trapped in the region and would eliminate the cyclic nature of the device. The fast acting siphon and equalizer tube are accordingly necessary to the present invention since there must be no plutonium fluid flow into the float chamber while the float is travelling the distance between slits 12.

A tantalum float 11 is placed in the chamber, said tantalum float containing a radioactive foil disposed horizontally, e.g., $Ta^{182}$. The gamma radiation from this foil is collimated through slits 12 of lead pig 13. Lifting screw 16 may be used to raise and lower the lead pig so that a variety of normal fluid levels may be accommodated. Radiation incident on crystal 14 is measured by photo tube 15. The electronic circuitry represented schematically here at 15 is set forth in FIGURE 3. Slits 12 are, for example, ¾ inch apart and 6 inches between the lead pig surface and the crystal will be sufficient to collimate the gamma radiation. A 3-inch sodium iodide crystal is utilized in the specific embodiment and the $Ta^{182}$ foil is about 10 millicuries. The distance from crystal to foil is about 12 inches and the diameter of the lower chamber 1 is about ¾ inch. The chambers and tubes are composed of tantalum since hot plutonium (about 600° C.) is very corrosive to other materials. The tantalum float may have arms in the horizontal position to center it in the chamber but this is an optional feature. The size of the slits in the vertical dimension should be no more than one-fifth the distance separating them.

Since no plutonium is entering the float chamber of the specific embodiment while the float is falling, the rate of fall at the top surface is proportional to the flow rate out of that chamber. Since the cross section of the lower chamber 1 is a known quantity, the device will yield an absolute measure of plutonium flow rate.

Figure 2:
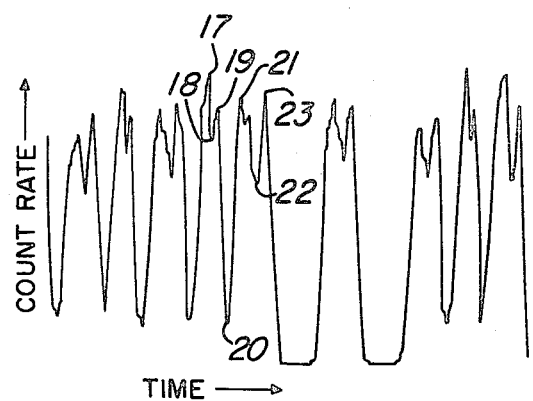
FIGURE 2 is a plot of count rate vs time illustrating typical results.

In normal operation only two slits of known separation are needed. Since the travel of the float must be greater than the slit separation, four counting rate peaks represent a cycle of the float. For example, in FIGURE 2 if point 17 represents the float position at the bottom slit, then as the float is lowered a point 18 is reached corresponding to the bottom of the float travel. The float then commences rising with an accompanying rise in the radiation level to point 19 which corresponds to the bottom slit position again. During the time that the float travels between the bottom slit and the top slit, the radiation drops to a very low point at 20 and rises until at 21 the float is on a level with the top slit. As the float continues above the top slit the radiation decreases until point 22 which corresponds to the top of the travel. Thereafter, as the float falls the radiation increases until at point 23 the top slit has been reached. The subsequent discontinuities shown in FIGURE 2 were cause by covering the bottom slit. This was done in order to differentiate between the top and bottom slits. The pitch, i.e., the time between top and bottom slits 19 and 21, together with the diameter will allow computation of the plutonium flow rate.

If a strongly radioactive fuel were being utilized, the need for the float would be obviated. That is, as the level of the radioactive liquid dropped below the top slit a step decrease in radioactivity would be observed and another step decrease in radioactivity as the liquid level passed the bottom slit. The time betwen these step decreases would allow computation of the flow rate.

Power supply 24 provides 1200 volt regulated direct current. Crystal 14 is a 3-inch NaI(Tl) activated detector with a mounted 3-inch photomultiplier 15 such that an energy resolution of 8% or less for $Cc^{137}$ is obtainable. The preamplifier 27, amplifier 28, and count rate meter 29 combination provides the capability of an output of 0–10 volts direct current proportional to the counting rate from the detector signal. The preamplifier is located near the photomultiplier in order to maintain a high signal to noise ratio. The high voltage supply, amplifier, count rate meter and recorder may be located as much as 200 feet from the detector. The X–Y recorder has a dual D.C. input with ranges that will accept the two signals. One is a voltage proportional to height (0–10 v. D.C.) and the other a voltage (0–10 v. D.C.) proportional to the counting rate. An auxiliary time base for the X-axis is useful in measuring the cyclic behavior of the device. Voltage proportional to height is provided by a 10K resistor (40-turn helipot, 1% linear over entire range) and a 10-v. battery 31. A voltage proportional to position is very satisfactory since a standard X–Y recorder may be used to record the data. Height control 32 is convenient in selecting the best position for the detector.

With no flow in the loop the detector and shield are moved by height control 32 (shown as 16 in FIGURE 1) and the counting rate plotted as a function of position. The plot is then correlated with position of the radioactive float. For normal operations the detector position coordinate may then be replaced by a time coordinate suitable to the flow rate.

The present device which requires a minimum amount of labor for maintenance and operation simply solves the problem of measuring the flow rate of hot molten metals which may be corrosive and/or radioactive. While one embodiment of the invention has been described it is clear that many modifications may be made by one skilled in the art without departing from the scope of the invention. For example, the device is adaptable to the measurement of the flow rate of any liquid. In addition, as explained above, the need for a float may be dispensed with if the material is strongly radioactive. Therefore, the present invention should not be limited by the foregoing description but solely by the appended claims.

What is claimed is:

1. A liquid flow meter comprising a chamber, said chamber being divided into upper and lower compartments, a radioactive detector having a collimated view of the lower compartment of said chamber, a source of radioactivity within the lower compartment of said chamber, said detector and chamber positionally arranged so that the rate of fall of liquid in the lower compartment is proportional to the flow rate of the liquid, fast acting valve means between the compartments of said chamber, said fast acting valve means comprising a siphon tube and an equalizer tube, the top of said equalizer tube being higher than the highest point of the siphon tube.

2. A liquid flow meter as in claim 1 wherein the source of radioactivity comprises a radioactive foil, said radioactive foil being placed in a float in the said chamber.

3. A liquid flow meter as in claim 1 wherein the radioactive source means is the liquid.

References Cited

UNITED STATES PATENTS

| | | |
|---|---|---|
| 2,554,715 | 5/1951 | Mellett. |
| 3,233,448 | 2/1966 | Brown _____ 23—226 |

ARCHIE R. BORCHELT, *Primary Examiner.*

M. J. FROME, *Assistant Examiner.*